US008811792B2

(12) United States Patent
Cook

(10) Patent No.: US 8,811,792 B2
(45) Date of Patent: Aug. 19, 2014

(54) OPTICAL CABLE CONNECTOR

(71) Applicant: Qwest Communications International Inc., Denver, CO (US)

(72) Inventor: Charles I. Cook, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 14/035,705

(22) Filed: Sep. 24, 2013

(65) Prior Publication Data

US 2014/0196269 A1    Jul. 17, 2014

Related U.S. Application Data

(63) Continuation of application No. 12/711,607, filed on Feb. 24, 2010, now Pat. No. 8,571,376.

(51) Int. Cl.
*G02B 6/00* (2006.01)
*G02B 6/36* (2006.01)
*G02B 6/44* (2006.01)
*G02B 6/42* (2006.01)
*G02B 6/38* (2006.01)

(52) U.S. Cl.
CPC ............ *G02B 6/4452* (2013.01); *G02B 6/4453* (2013.01); *G02B 6/4454* (2013.01); *G02B 6/4455* (2013.01); *G02B 6/4403* (2013.01); *G02B 6/4433* (2013.01); *G02B 6/4471* (2013.01); *G02B 6/4475* (2013.01); *G02B 6/4494* (2013.01); *G02B 6/4292* (2013.01); *G02B 6/3825* (2013.01); *G02B 6/3849* (2013.01); *G02B 6/3893* (2013.01); *G02B 6/3897* (2013.01)
USPC ............................. 385/135; 385/53; 385/100

(58) Field of Classification Search
CPC .............. G02B 6/4452–6/4455; G02B 6/3825; G02B 6/3849; G02B 6/3893; G02B 6/3897; G02B 6/4492; G02B 6/4403; G02B 6/4433; G02B 6/4471; G02B 6/4475; G02B 6/4494
USPC ........................................ 385/53, 100, 135
See application file for complete search history.

(56) References Cited

U.S. PATENT DOCUMENTS

| 8,571,376 | B2 | 10/2013 | Cook | |
| 2005/0147363 | A1* | 7/2005 | Chastain et al. | ............... 385/100 |
| 2007/0189679 | A1* | 8/2007 | Stahulak et al. | ............... 385/101 |
| 2011/0206335 | A1 | 8/2011 | Cook | |

OTHER PUBLICATIONS

U.S. Appl. No. 12/711,607, Notice of Publication dated Aug. 25, 2011; 1 page.
U.S. Appl. No. 12/711,607, Requirement for Restriction/Election dated Oct. 10, 2012; 8 pages.

(Continued)

*Primary Examiner* — Jerry Blevins
(74) *Attorney, Agent, or Firm* — Swanson & Bratschun, L.L.C.

(57) ABSTRACT

Methods, systems, and devices are disclosed for interconnecting two optical fibers using a protective insert, wherein the protective insert includes a connective segment that provides optical communication connection between the two optical fibers. Furthermore the protective insert includes two attachment mechanisms adjacent to the connective segment with each of the two attachment mechanisms adapted to removably attach one of the two optical fibers to the connective segment. Such a protective insert may be implemented inside a network interface device (NID) or with a wall-plate to be installed inside customer premises in a manner that allows a customer to easily interconnect a home network cable to an optical network terminal.

11 Claims, 12 Drawing Sheets

(56) References Cited

OTHER PUBLICATIONS

U.S. Appl. No. 12/711,607, Non-Final Rejection dated Mar. 5, 2013; 12 pages.
U.S. Appl. No. 12/711,607, Notice of Allowance dated Jun. 24, 2013; 19 pages.
U.S. Appl. No. 12/711,607, Issue Notification dated Oct. 9, 2013; 1 page.

* cited by examiner

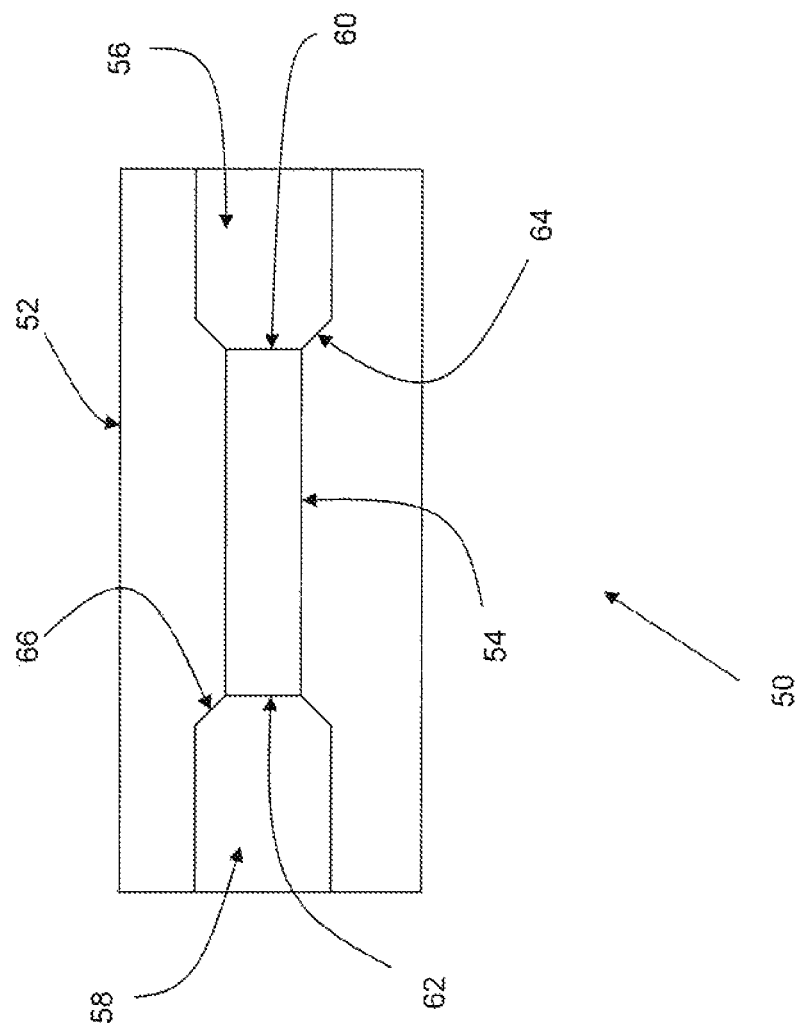

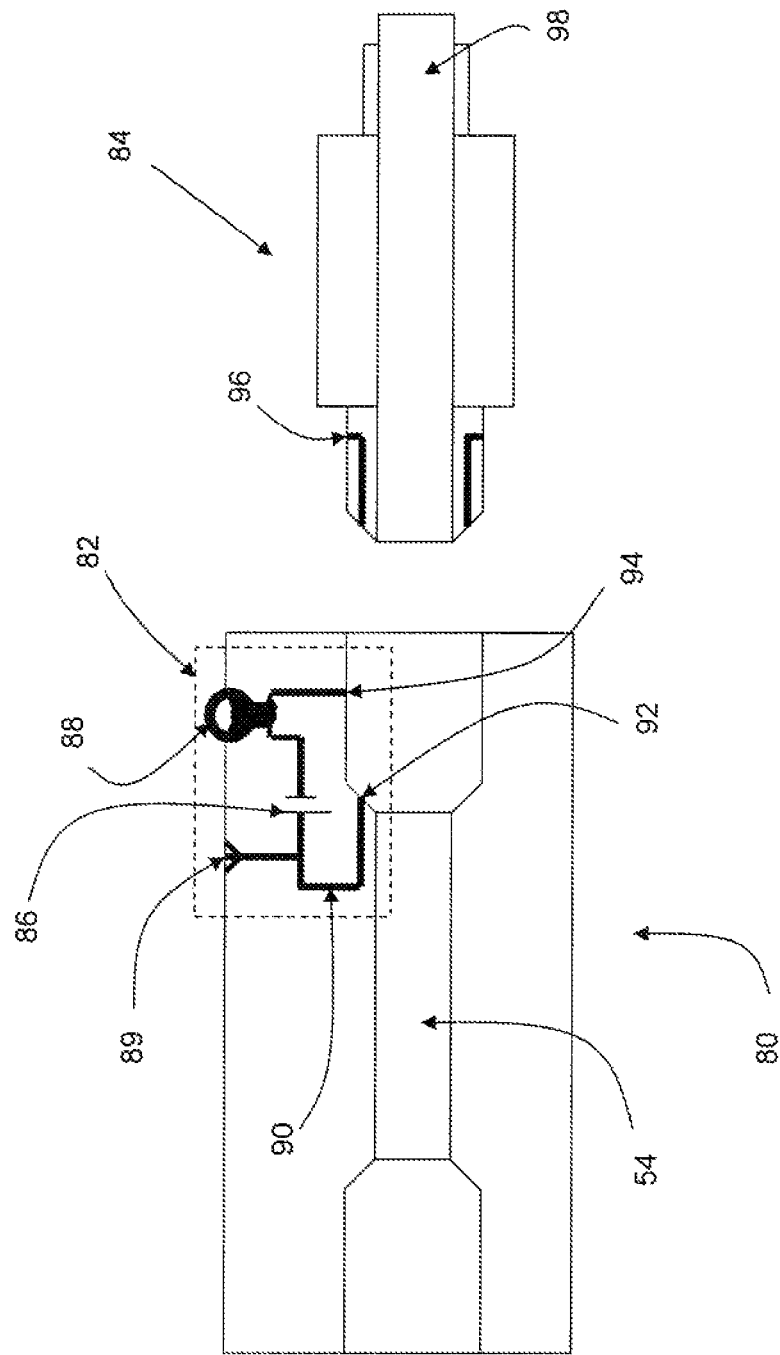

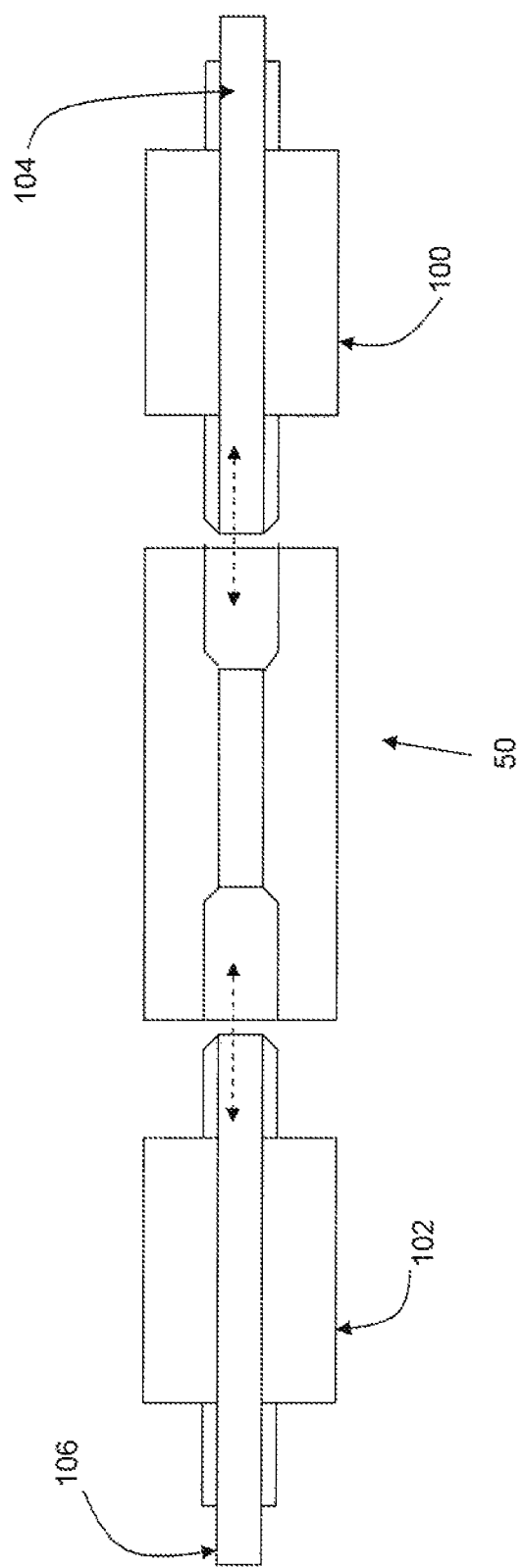

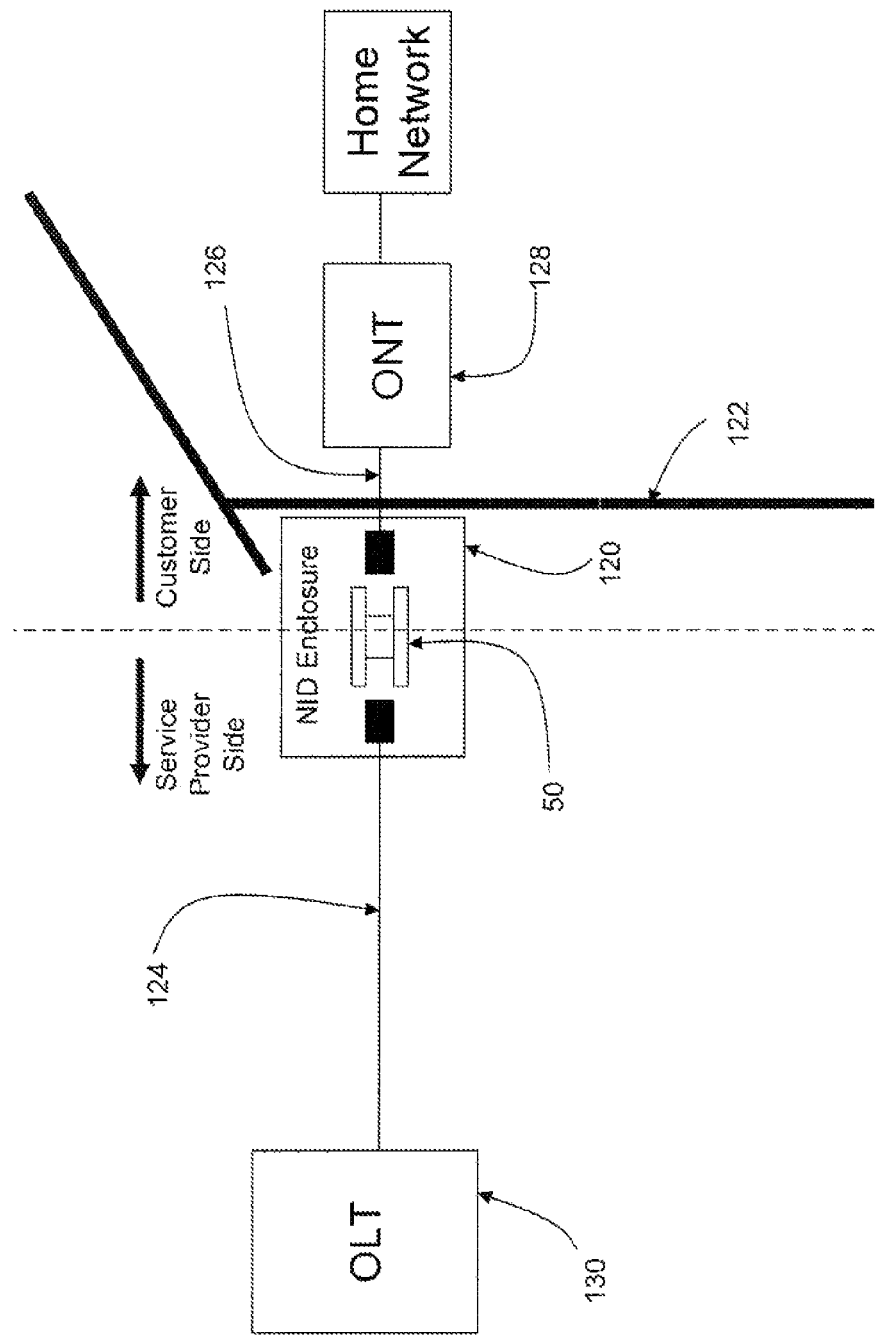

OPTICAL CABLE CONNECTOR

CROSS REFERENCE TO RELATED APPLICATION

This application is a continuation of U.S. patent application Ser. No. 12/711,607, filed Feb. 24, 2010 by Charles I. Cook and entitled, "Optical Cable Connector," which is hereby incorporated by reference in its entirety.

Embodiments of the invention are related to telecommunication services and, in particular, to fiber optics communication networks.

BACKGROUND

As information based industries constitute an ever growing part of national economies in many developed as well as developing countries, telecommunication networks have become an essential part of national infrastructure. Especially in developed economies, industries as well as societies are highly dependent on faster and easier access to information, entertainment, and education via the telecommunications networks. Optical fiber communication networks are among the fastest growing and very important part of communication networks that allow telecommunication companies to meet the ever growing need for more information, at faster speeds, by the consumers.

In a typical communication network providing services to consumers, a telecommunication service company may have a fiber optic cable installed at an end consumer's premises, where the end consumer may be a single residential unit, a multi-residence unit, a business, etc. Such an arrangement is often referred to as the fiber to the premises (FTTP). A typical FTTP is implemented by means of an optical network termination (ONT) device mounted on the exterior of the customer premises. Typically, the telecommunication service companies connect an optical cable to a network interface device (NID) installed outside the customer's premises wherein the NID hosts the ONT. However, a NID that is installed outside of a customer's premises is generally considered to be the property of the service provider, and therefore, the service provider becomes responsible for not only the cost of the NID but also the maintenance of the NID. When an NID is located outside of a customer's premises, it is exposed to weather elements such as rain, snow, cold, sun, heat, etc., and often the NID can require high levels of environment control, incurring high maintenance costs.

FIG. 1 illustrates an example implementation of a telecommunications network 10 using the FTTP service. The telecommunications network 10 may include an optical communications equipment (OCE) such as an optical line terminal (OLT) 12 that may be used to interconnect with one or more networks. Such networks may include the Internet 14, a public switched telephone network 16, and other networks 18, such as a wireless network, a satellite network, etc. The OLT 12 may be connected to such one or more networks 14-18 using fiber optic cables 20.

The OLT 12 may be located at the central office (CO) of a telecommunication company or at the head-end of a cable company. The OLT 12 may be used to generate synchronous optical networking (SONET), dense wavelength digital multiplexing (DWDM), or other signals appropriate for communication over fiber optics and communicate such signals over to optical network units (ONU) 22, to optical termination equipment such as optical network terminals (ONT) 24, to a splitter 26, etc. Alternatively, the OLT 12 may receive such signals from various networks 14-16 via the fiber optics 20 and route such signals over to the ONUs 22, the ONT 24, and the splitter 26.

The ONUs 22 are used to provide optical to electrical and electrical to optical conversion in a "fiber to the curb" (FTTC) or "fiber to the neighborhood" (FTTN) scenario. On the other hand, the ONTs 24 are used to terminate a fiber optic line, to de-multiplex the signal into its component parts (voice telephone, television, Internet, etc.), and to provide power to customer telephones. The output from the ONTs 24 may be fed into network interface devices (NIDs) 30 that are used to provide connectivity to a home based network 32, an office based network 34, etc.

It is important to ensure that the communicative interconnections provided by the NIDs 30 are robust as well as properly insulated from interferences. Generally, NIDs 30 may be implemented to host a number of different communicative paths, such as an optical cable connection, a DSL cable connection, etc. Any bad interconnection at the NIDs 30 may cause signal interference from one or more of such interconnections to the other interconnections. Moreover, the NIDs 30 may also be connected to a power supply and any faulty interconnections may expose the NIDs 30, as well as the premises where the NIDs 30 are located, to potential hazards caused by improper connection of power lines to one or more devices in the NIDs 30. Such potential problems with NIDs 30 are exaggerated by the fact that NIDs 30 located outside the premises may become exposed to various environmental conditions, such as rain, temperature swings, etc. Especially when the NIDs 30 are hosting any type of optical cables or optical interconnecting devices, it is necessary that such environmental effects are sufficiently controlled.

As discussed above, under this example implementation of the telecommunications network 10 and where any NID is located outside the customer's premises, the NID and the ONT are considered to be the property of the telecommunications service provider. As a result, the service provider generally becomes responsible for the upkeep and maintenance of the NID and ONT. Such maintenance may become expensive, especially when the equipment is subjected to harsh weather conditions. Therefore there is a need for a solution that allows a telecommunications service provider to reliably manage the equipment installed outside of the customer premises.

BRIEF SUMMARY

Among other things, embodiments of the present invention include methods, systems, and devices for providing telecommunication services.

An embodiment of the present invention provides a protective insert for interconnecting a first optical fiber with a second optical fiber, wherein the protective insert includes an optically connective segment, a first attachment mechanism adjacent to a first end of the optically connective segment and adapted to removably attach to the first optical fiber, a second attachment mechanism adjacent to a second end of the optically connective segment and adapted to removably attach to the second optical fiber, and a protective cover surrounding the optically connective segment, the first attachment mechanism, and the second attachment mechanism. In an alternate embodiment, the first attachment mechanism of the protective insert includes a signaling mechanism to provide a signal to a user regarding the status of the connection of the optically connective segment with the first optical fiber.

Another embodiment of the invention provides an optical network interface device (NID) including a protective insert as described herein, an optical network terminal (ONT) communicatively connected to the protective insert, and a customer premises node communicatively connected to the ONT.

An alternate embodiment of the invention provides a system for interconnecting a customer premises network with an optical line terminal (OLT), the system including: a wall-plate located on the customer premises having an optical fiber input node, a protective insert as described herein, wherein the protective insert is adapted to communicatively connect to the optical fiber input node, a first optical fiber communicatively connecting the optical fiber input node to the OLT, and an optical network terminal (ONT) attached to the wall-plate and having a first end terminal and a second end terminal, wherein the first end terminal is communicatively connected to the protective insert and the second end terminal is communicatively connected to the customer premises network.

Yet another alternate embodiment of the invention provides a system for interconnecting a first customer premises and a second customer premises with an optical line terminal (OLT), the system including an optical splitter communicatively connected to the OLT and having an input terminal, a first output terminal and a second output terminal, wherein the optical splitter is adapted to split an input optical signal received at the input terminal into a first optical output signal output at the first output terminal and a second optical output signal output at the second output terminal, a first protective insert as described herein, wherein the first protective insert communicatively connects the first consumer premises to the first output terminal, and a second protective insert as described herein, wherein the second protective insert communicatively connects the second consumer premises to the second output terminal.

An alternate embodiment of the invention provides a method of interconnecting an optical termination equipment located at a customer premises with an optical communications equipment on a telecommunications network, the method including communicatively connecting the optical communications equipment to an input node of an optical network interface device (NID), the NID including the input node, and a protective insert communicatively connected to the optical termination equipment, the protective insert comprising an optically connective segment, a first attachment mechanism adjacent to a first end of the optically connective segment and adapted to removably attach to the first optical fiber, a second attachment mechanism adjacent to a second end of the optically connective segment and adapted to removably attach to the second optical fiber, and a protective cover surrounding the optically connective segment, the first attachment mechanism, and the second attachment mechanism; communicatively connecting the input node of the NID to the first end of the optically connective segment; communicatively connecting the second end of the optically connective segment to the customer premises node, and communicatively connecting an input node of the optical termination equipment to the customer premises node.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 2A shows a simplified diagram of one embodiment of a protective insert.

FIG. 2B shows a simplified diagram of an alternate embodiment of a protective insert.

FIG. 3 shows a simplified diagram illustrating use of the protective insert of FIG. 2A in a telecommunication network.

FIG. 5 shows an example configuration of a telecommunications network using a protective insert;

DETAILED DESCRIPTION

Figure 1:
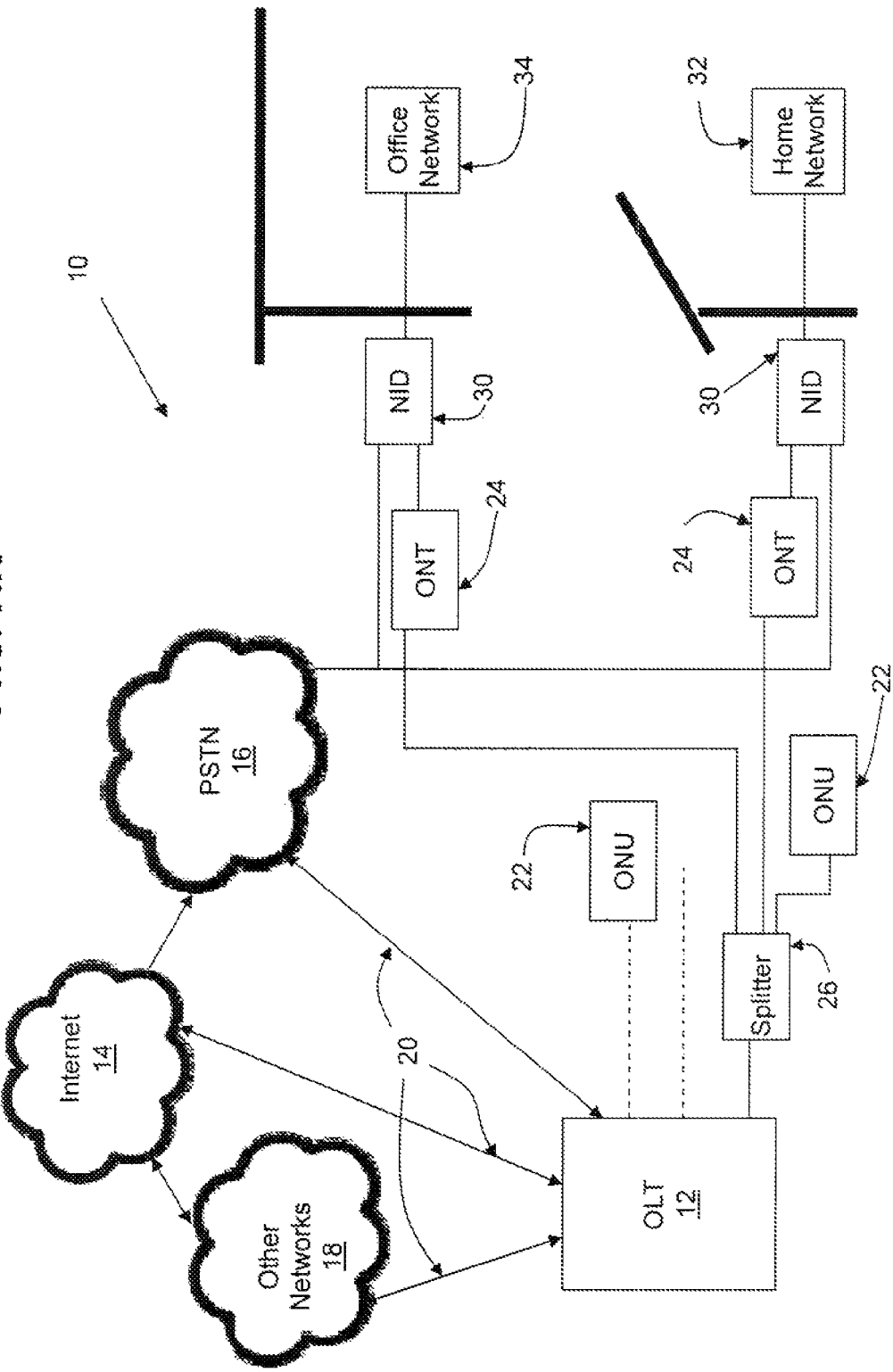
FIG. 1 shows a simplified diagram of a traditional telecommunication network.

There are various configurations and embodiments that may be used to implement the present invention. In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features. Further, while various embodiments may be described with reference to the Internet, embodiments of the invention may be implemented in any telecommunications network.

As disclosed below in further detail, the system and method described herein allow the provision of an optical fiber connection into a customer's premises and ensure that any interfacing equipment is located inside the customer premises. In such an arrangement, the customer may become responsible for purchasing, setting up, and maintaining any network interface equipment that may be necessary for interconnecting the customer's home network with the optical fiber connection from the service provider. However, under this arrangement, as the customer becomes responsible for making the appropriate connections, it becomes more likely that customers may damage optical fiber connectors. This is especially true because optical connectors typically are not sufficiently rugged to permit untrained people to fasten and remove optical connectors multiple times without potentially damaging network fiber. Once an end of a network fiber is damaged, it is often likely that the service on that fiber will be impaired and a service dispatch is required to reconnect and polish the end of the optical fiber. This becomes expensive, inconvenient, and time-consuming for both the end customer and the service provider. The system and method disclosed herein provide a solution that allows an untrained customer to connect an optical network fiber to a customer premises equipment, without intervention from the service provider. Unless the context clearly indicates otherwise, as used herein, the term "connect," means to place into communication (e.g., optical communication, electrical communication, etc.) the two elements being connected, for example, so that signals (optical, electrical) may be passed unidirectionally and/or bidirectionally from one element to the other. This functionality may include, but need not necessarily include, physically coupling the two elements, securing such a physical coupling, and/or the like. Similarly, two elements that are said to be "connected" are in communication with one another to allow signals to pass from one element to the other, and a "connection" between two elements means that the two elements are in communication with one another FIG. 2A illustrates a simplified diagram of one embodiment of a protective insert 50. The protective insert 50 illustrated in FIG. 2A includes a body 52, an optical connecting segment (such as, for example, a protective insert fiber optic) 54, a first attachment mechanism 56, and a second attachment mechanism 58. The first attachment mechanism 56 may be a housing defining a first opening and the second attachment mechanism 58 may be a housing defining a second opening. The body 52, also referred to as a protective cover, of the protective insert 50 may be made of any of a number of different materials that may be used to house fiber optic cables in a secure condition and it acts as a protective cover for the optical connecting segment 54, the first attachment mechanism 56, and the second attachment mechanism 58. Preferably the material used for the body 52 of the protective insert 50, especially when the protective insert 50 is to be used outside, may use material that insulates the optic from harsh environment factors and ultraviolet (UV) radiation. Such materials include polyvinylchloride (PVC), polyethylene (PE), Kevlar, etc.

The optical connecting segment 54 may be made of any of the generally used fiber optics that is designed to convey information from one end to the other end in optical format. Generally, fiber optics are made of glass or plastic fiber that transmits light along its length. Glass optical fibers are generally made from silica, but some other materials, such as fluorozirconate, fluoroaluminate, and chalcogenide glasses, may also be used for longer-wavelength infrared applications. Plastic optical fibers are commonly step-index multi-mode fibers that typically have higher attenuation co-efficients than glass fibers. As one of skill in the art will appreciate, the optical connecting segment 54 may be made of any such material described above or any other alternate comparable material.

The optical connecting segment 54 has open communicative surfaces on its two ends where a first end 60 is open to the first attachment mechanism 56 and a second end 62 is open to the second attachment mechanism 58. In an embodiment, the open surfaces of the first end 60 and the second end 62 may be beveled to reduce reflections. In an implementation of the protective insert 50, the optical connecting segment 54 is designed in a manner so as to be bi-directionally communicative. However, in alternate embodiments, the optical connecting segment 54 may be communicative in only one direction. Moreover, in another embodiment, the protective insert 50 may have the first end 60 and the second end 62 polished in a manner so as to give them typical end curvature so that they can be easily communicatively connected to other fibers with minimal loss in signal power. For example, in an alternate embodiment, the first end 60 and the second end 62 may be flush or appropriately shaped to improve the performance of the protective insert 50.

The first attachment mechanism 56 and the second attachment mechanism 58 are designed in a manner so as to removably attach an optical fiber or a fiber optic cable. For example, these attachment mechanisms may be provided with screw-in threads on its inner surface so that a fiber optic cable with compatible screw-on threads on its outer surface may be screwed into these attachment mechanisms. Alternatively, the first attachment mechanism 56 and the second attachment mechanism 58 may designed to attach fiber optic cables via a push-and-click mechanism, via a turn-and-latch mechanism, etc. The lengths of the first attachment mechanism 56 and the second attachment mechanism 58 may be designed in a manner so that when a fiber optic cable is removably attached to the protective insert 50 on either end, the optical fiber in such cable is communicatively connected to the optical connecting segment 54 without damaging to the surface of the optical connecting segment 54. Alternatively, the first attachment mechanism 56 and the second attachment mechanism 58 may be provided with tapered inner surfaces 60 and 62 so that an optical fiber cable inserted into these attachment mechanisms cannot reach a depth where it may damage the first surface 60 and the second surface 62.

FIG. 2B shows a simplified diagram of an alternate embodiment of a protective insert 80. The protective insert 80, includes all of the components 52-66 of the protective insert 50 as illustrated in FIG. 2A. Additionally, the protective insert 80 provides for a signaling mechanism 82 that provides a user of the protective insert 80 with a signal when an optical cable or other communicative apparatus is communicatively connected to the optical connecting segment 54. For example, FIG. 2B illustrates an optical cable plug 84 that may be communicatively connected to the protective insert 80.

The signaling mechanism 82 includes a power source 86, a signaling device 88 and a circuit 90 that connects the power source 86 to the signaling device 88. The signaling device 88 can be any commonly known source of signal such as a light emitting diode (LED), a light bulb, a device generating an audible signal, etc Alternatively, the signaling mechanism 82 may also include a wireless signal generator 89 that transmits a wireless signal to a central network if there is any potential problem, such as a loss of connection, etc., (and/or when a solid connection exists). The circuit 90 is designed so as to form a partial circuit that is not complete by itself. The circuit ends (terminals) 92 and 94 of the circuit 90 may be designed in a manner so that when the optical cable plug 84 is inserted into the protective insert 80, the circuit 90 is completed by a conductive connector 96 located in the optical cable plug 80. Moreover, the position of the circuit ends 92 and 94 and the position of the connector 96 may be designed so that when the circuit 90 is completed at the optimal position where the optical connecting segment 54 is communicatively connected to an optical cable plug connector 98. In an embodiment of the protective insert 80, the circuit 90 and the connector 96 are designed in a manner so that the optical connecting segment 54 is communicatively connected to the optical cable plug connector 98 without causing any damage to either of the optical connecting segment 54 and the optical cable plug connector 98. In an embodiment of the protective insert 80, the wireless signal generator 89 of the signaling mechanism 82 may send a signal to a central network when the optical cable plug 84 is successfully connected to the optical connecting segment 54.

The protective insert 80 allows a user to communicatively connect the optical cable plug 84 or other similar communicative apparatus to one end of the protective insert 80 without causing any damage to the optical connecting segment 54. In an embodiment of the protective insert 80, the signaling mechanism 82 may be implemented on each end of the protective insert 80. In an alternate embodiment, the signaling mechanism 82 may have a timer included within the circuit 90 so that once the optical cable plug 94 is communicatively connected to the optical connecting segment 54, after a predetermined time period, the signaling device 88 is automatically turned off.

FIG. 3 shows a simplified diagram illustrating an example use of the protective insert 50 of FIG. 2A in a telecommunication network. In the diagram illustrated in FIG. 3, the protective insert 50 is used to communicatively connect an optical cable 100 with another optical cable 102. In an example implementation, the optical cable 100 may be part of an optical cable plug that may be connected on its first end 104 to an ONT, such as the ONT 24 disclosed in FIG. 1. In an alternate embodiment, the optical cable 100 may be an integrated part of an ONT itself. The optical cable 102 may be part of an optical fiber provided by a telecommunications service provider that provides a connection to an OLT via its first end 106. Alternatively, the optical cable 102 may be connected via its first end 106 to an ONU such as the ONU 22 illustrated in FIG. 1 or to an optical splitter such as an optical splitter 26 illustrated in FIG. 1.

Figure 4:
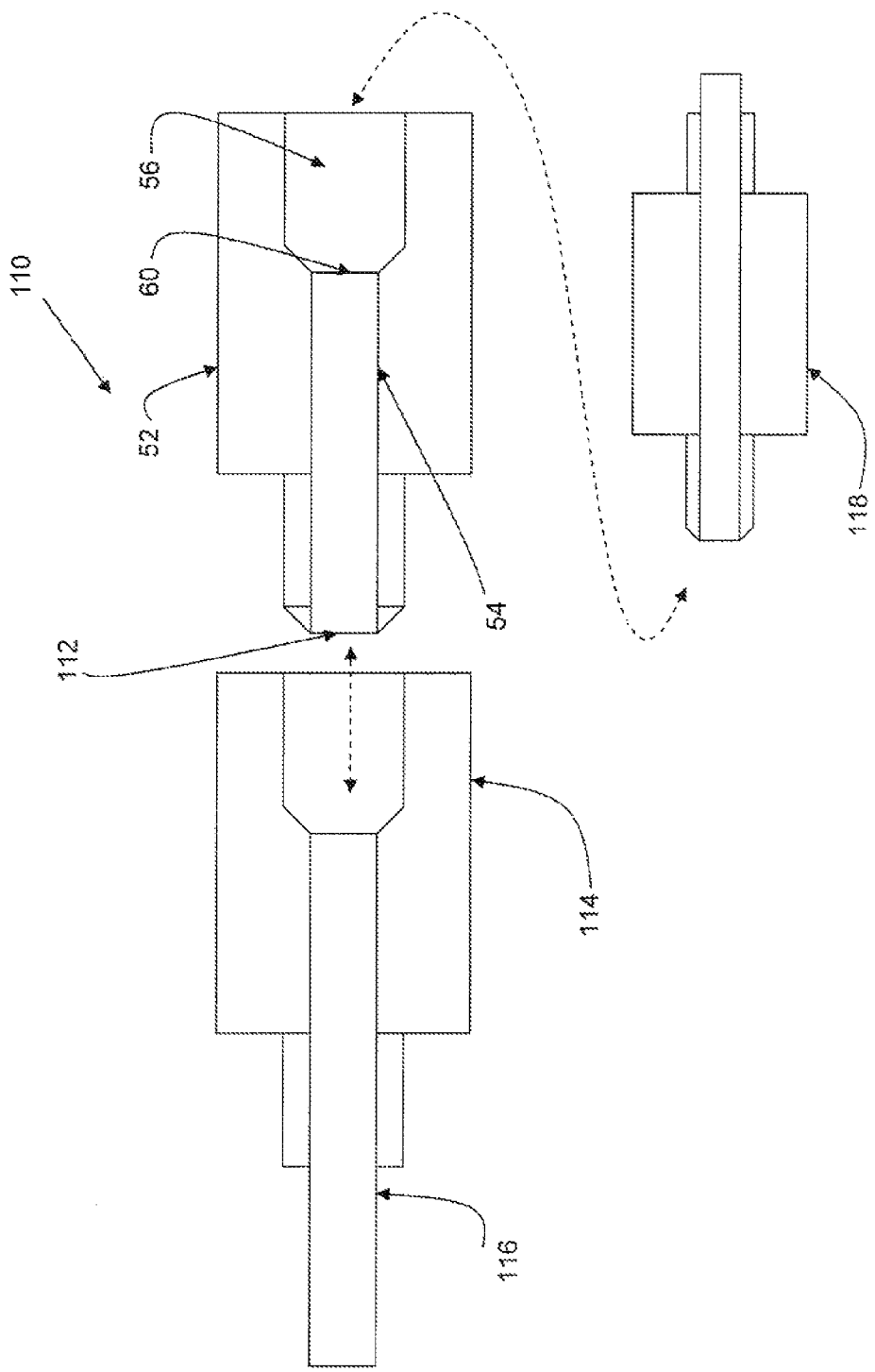
FIG. 4 shows a simplified diagram illustrating use of an alternative embodiment of a protective insert.

FIG. 4 shows a simplified diagram illustrating an example use of an alternative embodiment of a protective insert 110. The protective insert 110 is similar to the protective insert 50 in the sense that the protective insert 110 includes the body 52, the optical connecting segment 54, and a first attachment mechanism 56. Additionally the protective insert 110 also includes a first male connector 112 including one end of the optical connecting segment 54. The first male connector 112 may be designed so that it may be removably and communicatively connected to a female connector 114 of an optical cable 106. As illustrated in FIG. 4, the protective insert 110 may be used to communicatively connect an optical cable 116 to an optical cable plug 118. In an alternate embodiment of the protective insert 110, a signaling mechanism such as the signaling mechanism 82 may be incorporated in one end of the protective insert 110.

FIG. 5 shows an example configuration of a telecommunications network using a protective insert such as the protective inserts 50, 80, and 110. The configuration illustrated in FIG. 5 provides for using the protective insert 50 inside a network interface device (NID) 120. The NID 120 may be installed outside a customer premises 122 in a manner so that the NID 120 provides communication between optical cable 124 from a telecommunications service provider and customer premises cable 126 connecting to an ONT 128 located inside the customer premises 122. The optical cable 124 may be connected to an OLT 130 such as the OLT 12 illustrated in FIG. 1. Alternatively, the optical cable 124 may also be connected to an ONU such as the ONU 22 or a splitter such as the splitter 26.

Providing the NID 120 with the protective insert 50 allows a user to easily connect the incoming optical cable 124 with the customer premise cable 126. In an alternate embodiment, more than one protective inserts 50 maybe used in the NID 120. Because the protective insert 50 is adapted to removably connect two optical fibers, in such an alternative embodiment, if there are more than one incoming cables into the NID 120 to be connected to more than one outgoing cables, a user may just use such multiple protective inserts 50 to facilitate such connections without having to make any permanent change to the NID 120. In an alternate embodiment, the protective insert 50 may be implemented in the NID 120 so that one incoming optical cable 124 is communicatively connected to a plurality of outgoing cables, such as customer premise cables 126, 126a, 126b connecting to the ONTs 128, 128a, 128b, etc. (the cables 126a, 126b and the ONTs 128a, 128b, are not shown herein).

Figure 6A:
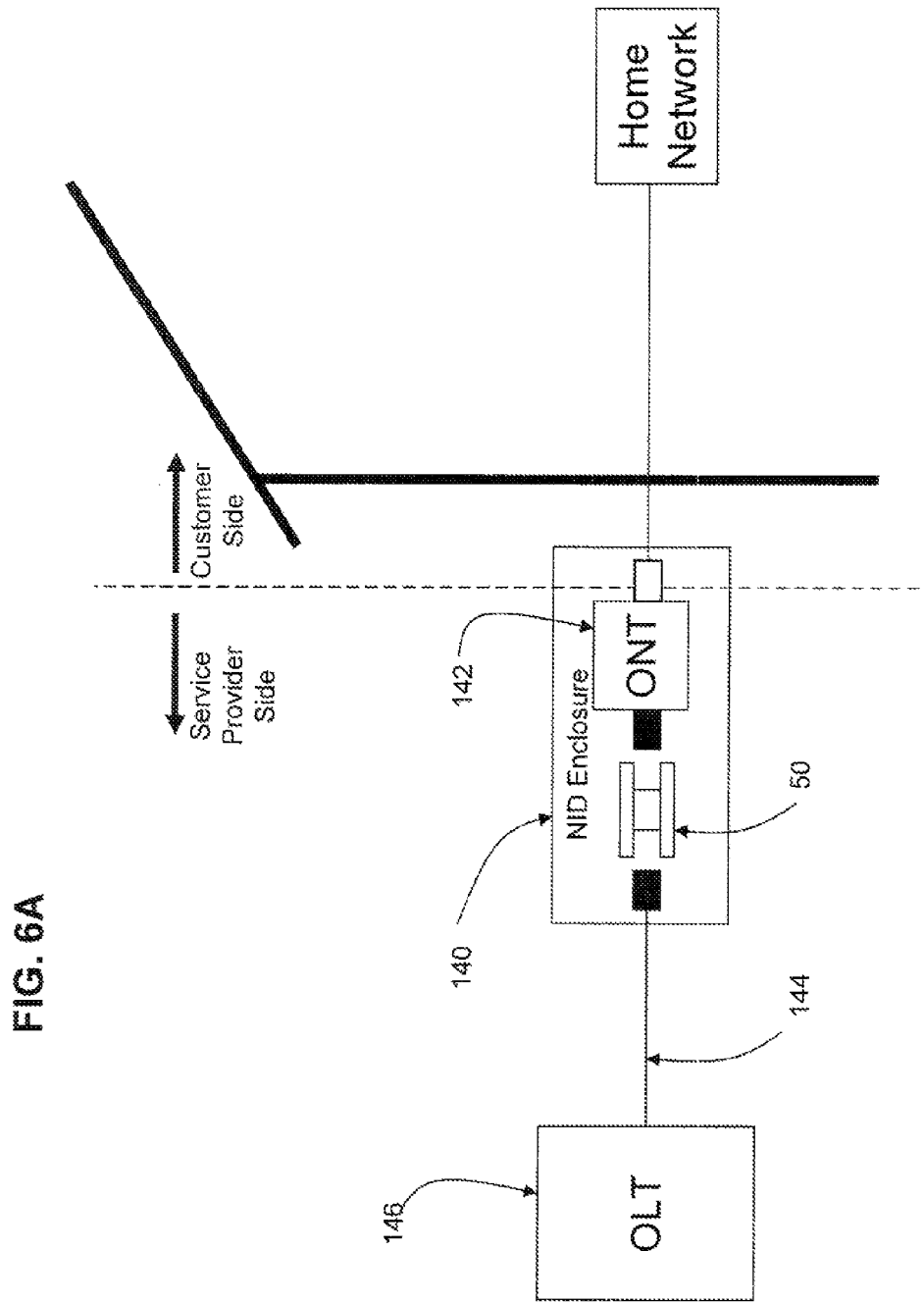
FIG. 6A shows an alternate example configuration of a telecommunications network using a protective insert.

FIG. 6A shows an alternate example configuration of a telecommunications network using a protective insert such as the protective inserts 50, 80, and 110. In the configuration disclosed in FIG. 6A, the protective insert 50 may be located within a NID 140. Additionally, the NID 140 may also include an ONT 142. In this configuration, the protective insert 50 may be used to communicatively and removably connect an incoming optical cable 144 with the ONT 142. The optical cable 144 may be used to carry bi-directional or uni-directional communication from the ONT 142 to an OLT 146 or to an ONU such as the ONU 22 or a splitter such as the splitter 26. Providing the NID 140 with the protective insert 50 allows a user to easily connect the optical cable 144 with the ONT 142 without damaging the connective end of the ONT 142.

Figure 6B:
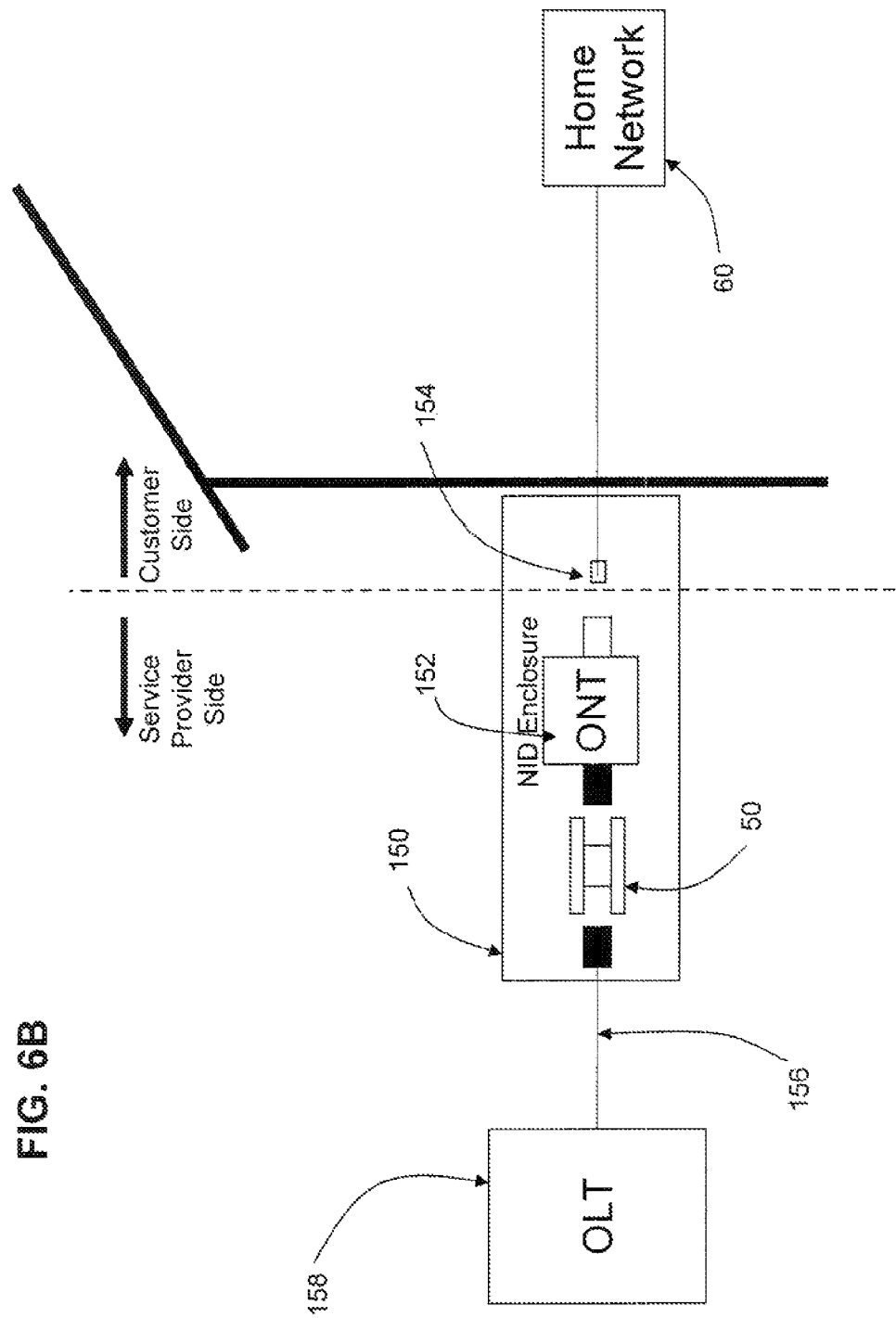
FIG. 6B shows an alternate example configuration of a telecommunications network using a protective insert.

FIG. 6B shows an alternate example configuration of a telecommunications network using a protective insert such as the protective inserts 50, 80, and 110. In the configuration disclosed in FIG. 6B, the protective insert 50 may be located within a NID 150. Additionally, the NID 150 may also include an ONT 152 and an output terminal 154 (such as a customer premises node) for an electrical connection. In this configuration, the protective insert 50 may be used to communicatively and removably connect an incoming optical cable 156 with the ONT 152. The optical cable 156 may be used to carry bi-directional or uni-directional communication from the ONT 152 to an OLT 158 or to an ONU such as the ONU 22 or a splitter such as the splitter 26. The output terminal 154 may be an industry standard output terminal such as an RJ-45 plug terminal that can communicatively connect to an RJ-45 cable. Providing the NID 150 with the protective insert 50 allows a user to easily connect the optical cable 156 with the ONT 152 without damaging the connective end of the ONT 152. Moreover, providing the NID 150 with the output terminal 154 allows a user to easily connect a home network 160 to the NID 150.

Figure 7:
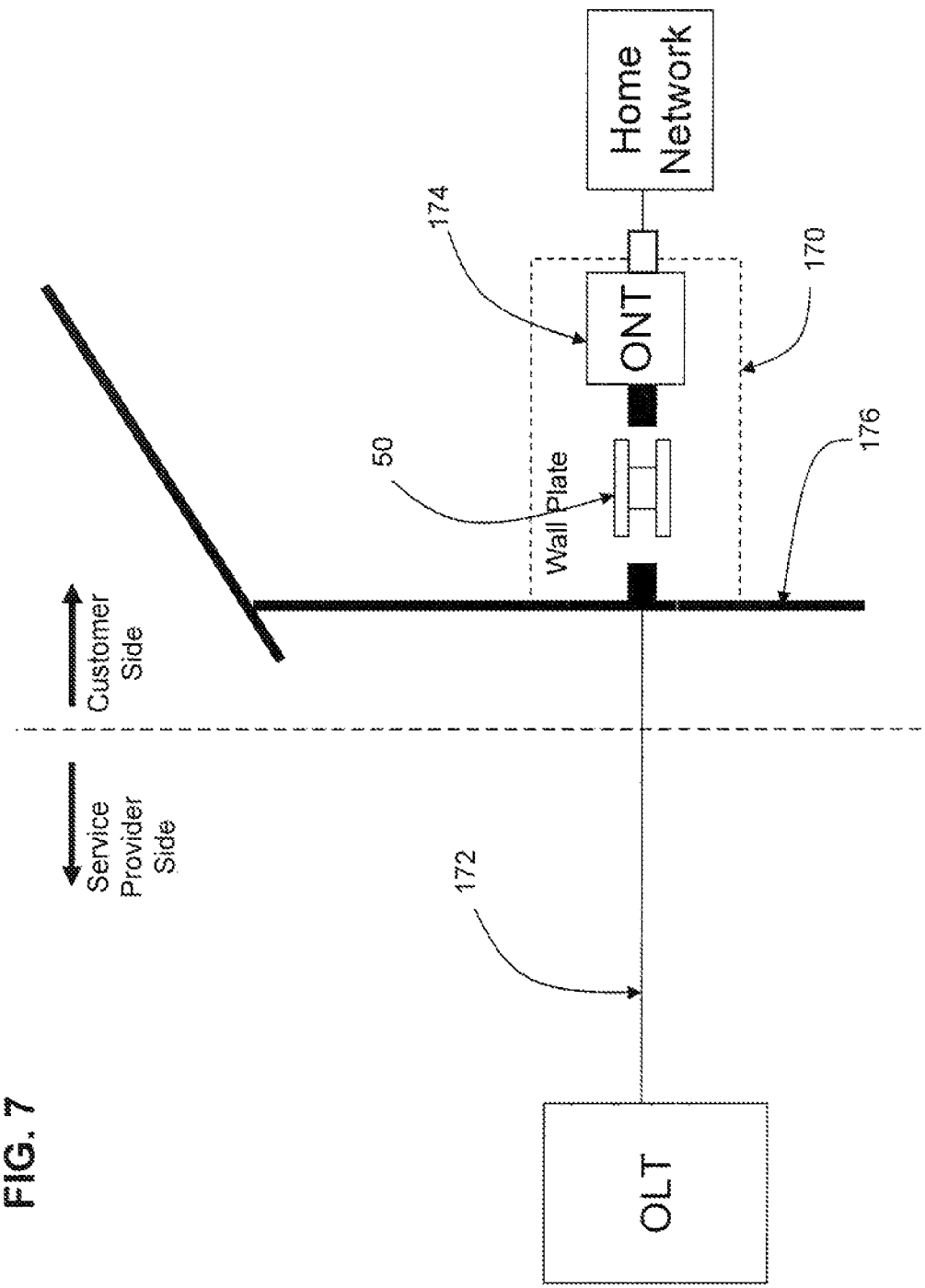
FIG. 7 shows an alternate example configuration of a telecommunications network using a protective insert.

FIG. 7 shows an alternate example configuration of a telecommunications network using a protective insert such as the protective inserts 50, 80, and 110. In the configuration disclosed in FIG. 7, the protective insert 50 may be used on or in a wall plate 170 to communicatively connect an optical cable 172 with an ONT 174. The wall plate 170 may be located inside a customer premises 176. In this configuration, the protective insert 50 may be removably attached to the wall plate 170 or it may be used as a loose connector between the optical cable 172 and the ONT 174.

In the configuration illustrated in FIG. 7, the wall plate 170, the ONT 174 and the protective insert 50 are all located within the customer premises 176. As a result, the maintenance and upkeep of these components may become the responsibility of the customer. Providing the protective insert 50 allows a customer to easily connect the ONT 174 with the optical cable 172 without causing any damage to the optical fibers in the ONT 174 and the optical cable 172. Moreover, if there is any damage to the protective insert 50 due to carelessness or lack of skill on the part of the consumer, instead of having to send a technician to fix the ONT 174, a telecommunication service provider may simply mail another protective insert 50 to the customer for replacement. Thus, providing the protective insert 50 with the wall plate 170 allows a telecommunication service provider to provide reliable and more efficient installation and maintenance service to the customer.

Additionally, if it becomes necessary for the customer to move the ONT 174 from one room to another more convenient location, the customer may be able to simply use a flexible optical cable (as available) with protective inserts 50 on both ends for moving the ONT 174 from one location to another.

Figure 8:
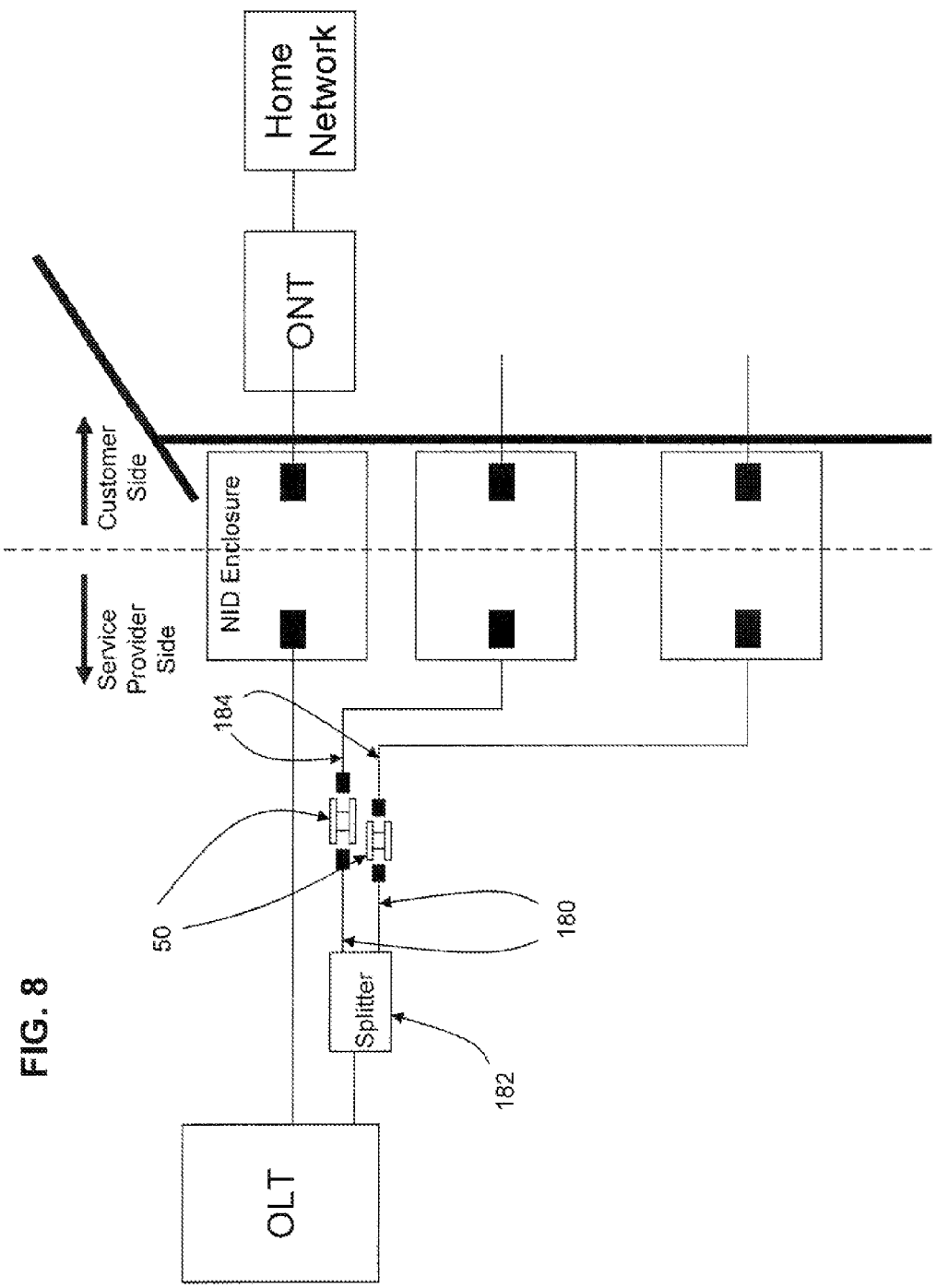
FIG. 8 shows an alternate example configuration of a telecommunications network using a protective insert.

FIG. 8 shows an alternate example configuration of a telecommunications network using a protective insert such as the protective inserts 50, 80, and 110. In this configuration of the network, protective inserts 50 are used to connect fiber optic cables 180 coming out of a splitter 182 to fiber optic cables 184. Providing protective inserts 50 allows connecting the cables 180 and 184 without damaging the connective ends of the cables 180 and 184. Moreover, because the protective inserts 50 are relatively easy to use, as compared to establishing permanent connections between the cables 180 and 184 for example, a relatively unskilled technician or user can establish such a communication without requiring the expensive training or equipment that is typically necessary to permanently connect the cables 180 and 184.

Figure 9:
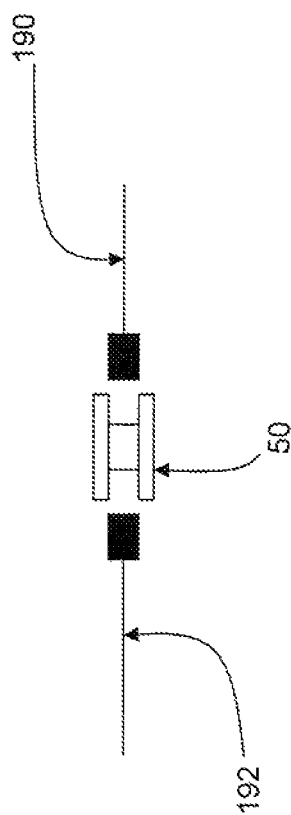
FIG. 9 shows an alternate example configuration of a telecommunications network using a protective insert.

FIG. 9 shows an alternate example configuration for using a protective insert such as the protective inserts 50, 80, and 110. In this configuration, the protective insert 50 may be used to communicatively and removably connect an optical cable 190 with an optical cable 192. In some embodiments, the configuration illustrated in FIG. 9 may be used to replace a damaged portion of an optical cable, to patch a cut cable, and/or the like. In alternate embodiments, the configuration illustrated in FIG. 9 may be used to connect a plurality of incoming cables with a plurality of outgoing cables so that if it becomes necessary to change the combination of incoming and outgoing cables, such changes can be performed without having to alter permanent connections between the cables.

It will be apparent to those skilled in the art that substantial variations may be made in accordance with specific requirements to all of the systems other embodiments described above. The protective insert 20 may be located at many of the various locations on the telecommunication network 10, even if such an implementation is not described herein. By way of example, the protective insert 50 may be used to connect the OLT 12 to the splitter 26, or to connect the splitter 26 to the ONU 22, etc.

Figure 10:
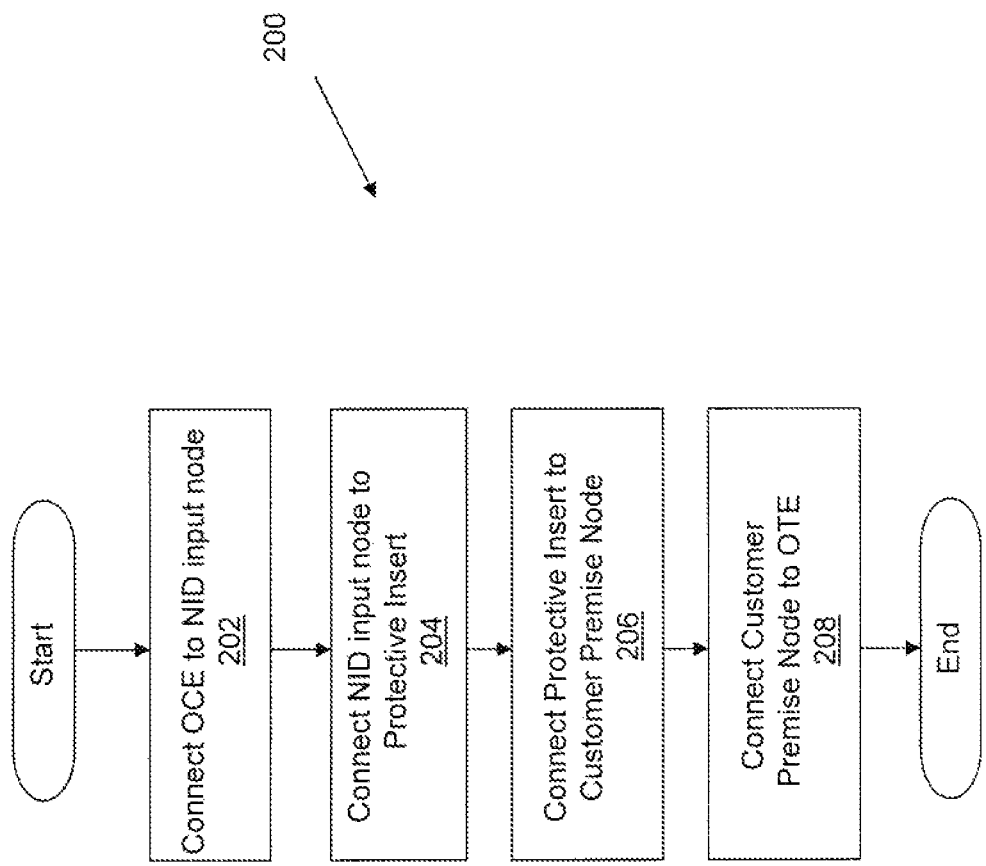
FIG. 10 shows a method of interconnecting an optical communication equipment with an optical termination equipment.

Turning now to FIG. 10, a flowchart 200 illustrates a method of interconnecting an optical termination equipment (OTE) located at a customer premises with an optical communication equipment (OCE) on a telecommunications network. As shown in FIG. 10, at 202, the OCE is communicatively connected to an input node of an optical NID, such as a NID described above in FIGS. 5, 6A, and 6B. Subsequently, at 204, the input node of the NID is communicatively connected to the first end of the optically connective segment of a protective insert. At 206, the second end of the optically connective segment of the protective insert is communicatively connected to a customer premise node. Finally, at 208, the customer premise node is communicatively connected to an input node of the optical termination equipment, such as an ONT that may be located at a customer premises.

While the invention has been described with respect to example embodiments, one skilled in the art will recognize that numerous modifications are possible. Further, while various systems described herein may be described with respect to particular structural and/or functional components for ease of description, systems are not limited to any particular structural and/or functional architecture but instead can be implemented on any suitable hardware and/or firmware configurations. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate example features, the various components and/or features described herein with respect to a particular embodiment can be substituted, added, and/or subtracted from among other described embodiments, unless the context dictates otherwise. Consequently, although the invention has been described with respect to example embodiments, it will be appreciated that the invention is intended to cover all modifications and equivalents within the scope of the following claims.

What is claimed is:

1. A method of interconnecting an optical termination equipment located at a customer premises with an optical communications equipment on a telecommunications network, the method comprising:
    communicatively connecting the optical communications equipment to an input node of an optical network interface device (NID), the NID including:
        the input node, and
        a protective insert communicatively connected to the optical termination equipment, the protective insert comprising an optically connective segment, a first attachment mechanism adjacent to a first end of the optically connective segment and adapted to removably attach to the first optical transmission medium, a second attachment mechanism adjacent to a second end of the optically connective segment and adapted to removably attach to the second optical transmission medium, and a protective cover surrounding the optically connective segment, the first attachment mechanism, and the second attachment mechanism, communicatively connecting the input node of the NID to the first end of the optically connective segment;
    communicatively connecting the second end of the optically connective segment to the customer premise node; and
    communicatively connecting an input node of the optical termination equipment to the customer premise node.

2. The method of claim 1, wherein the optical termination equipment is an optical network terminal (ONT) and the optical communications equipment is an optical line terminal (OLT).

3. The method of claim 2, wherein the ONT is a passive ONT.

4. The method of claim 1, wherein at least one of the attachment mechanisms further includes a signaling mechanism to provide a signal to a user regarding the connection of the optically connective segment with the first optical transmission medium.

5. The method of claim 1, wherein at least one of the attachment mechanisms further includes a signaling mechanism to provide a signal to a user regarding the connection of the optically connective segment with the first optical transmission medium.

6. The method of claim 5, wherein the signaling mechanism is adapted to send a wireless signal to the user.

7. The method of claim 1, wherein at least one of the attachment mechanisms is adapted to removably attach to the first optical transmission medium using a screw-thread mechanism.

8. The method of claim 1, wherein at least one of the attachment mechanisms is adapted to removably attach to the first optical transmission medium using a screw-thread mechanism.

9. The method of claim 1, wherein the optically connective segment comprises an optical transmission medium.

10. The method of claim 1, wherein the input node is communicatively coupled with the optical communications equipment via an optical splitter.

11. The method of claim 1, wherein an end terminal of the optical termination equipment is attached to customer premises network via an RJ-45 cable.

\* \* \* \* \*